No. 754,914. Patented March 15, 1904.

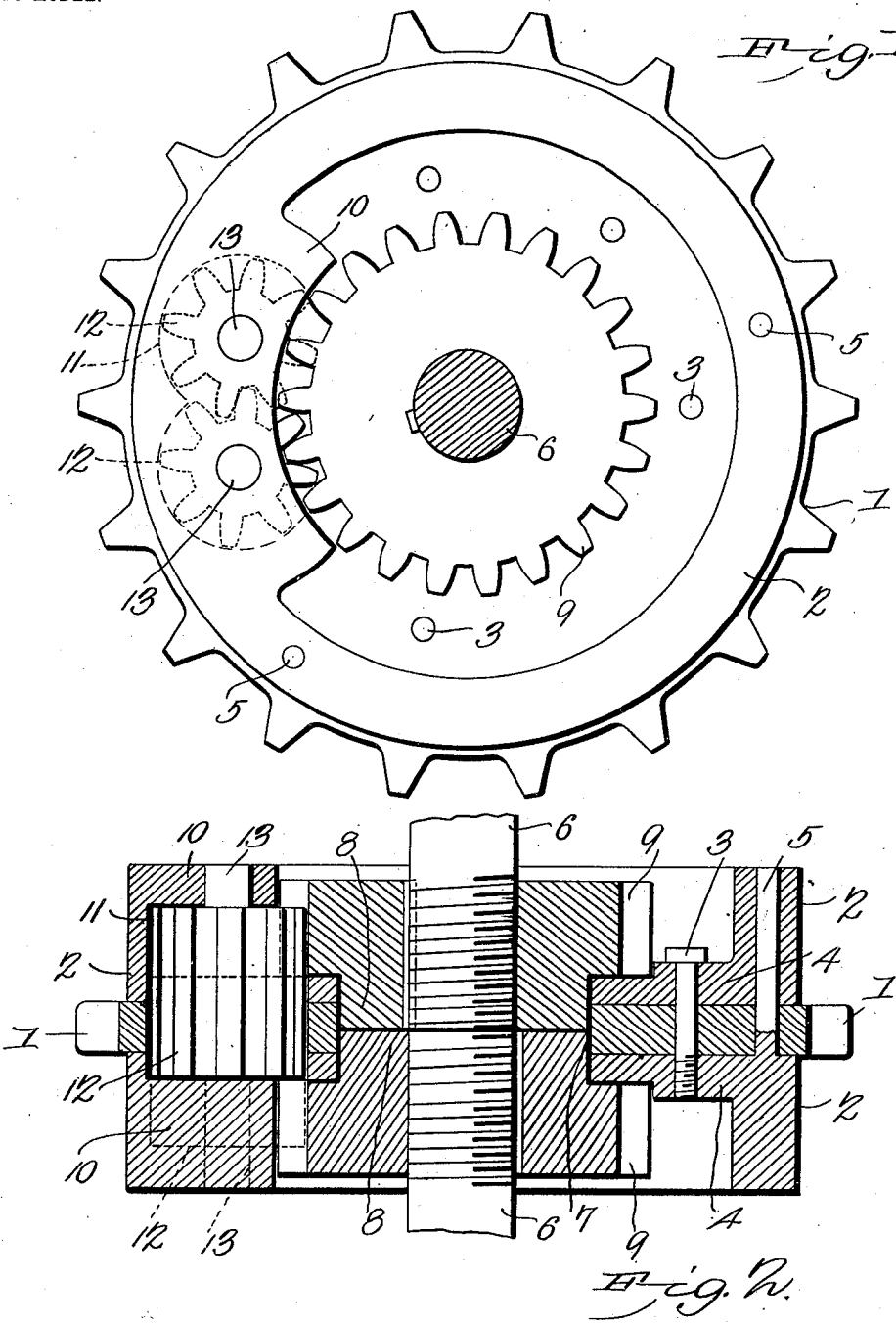

UNITED STATES PATENT OFFICE.

HARRY E. BAYLEY, OF INDIANAPOLIS, INDIANA, ASSIGNOR OF ONE-HALF TO WILLIAM S. HOLCOMBE, OF BEDFORD, INDIANA.

DIFFERENTIAL GEARING.

SPECIFICATION forming part of Letters Patent No. 754,914, dated March 15, 1904.

Application filed August 21, 1903. Serial No. 170,339. (No model.)

*To all whom it may concern:*

Be it known that I, HARRY E. BAYLEY, a citizen of the United States, residing at Indianapolis, in the county of Marion and State of Indiana, have invented a new and useful Differential Gearing, of which the following is a specification.

My invention relates to differential gearing, and has for its object to produce a device of this character of simple construction which will be efficient in operation and one which is especially adapted for use in automobile construction in connecting two driving-shafts which are driven in the same direction by a common driving member.

Another object of the invention is the combination of parts, their arrangement, and mechanical construction whereby the driving-shafts are permitted to rotate at different speeds while being driven by a common driving member, the decreasing speed of one shaft increasing proportionately the speed of the other.

To these ends the invention comprises the novel details of construction and combination of parts, as more fully hereinafter described.

In the accompanying drawings, Figure 1 is a side elevation of my improved gear. Fig. 2 is a horizontal transverse section through the same.

Referring to the drawings, 1 indicates a driving member, preferably in the form of a sprocket-wheel, to which is attached a pair of ring-like members 2, disposed one on either side of the sprocket-wheel and secured thereto by bolts 3 or otherwise. These members, which constitute, in effect, laterally and horizontally extending annular flanges provided upon the sprocket-wheel, have each a web 4, which lies snugly against the adjacent face of the wheel 1 and through which the bolts 3 pass, while one of the members is provided upon its inner face with a pair of horizontal pins 5, extending through suitable alined perforations in the sprocket and other member for maintaining the parts in their proper relative positions.

6 6 indicate a pair of driven shafts disposed end to end in parallel alinement and extending through a central opening 7, formed through the sprocket and the webs of the members 2, said opening being sufficiently large to receive the hubs 8 of a pair of spur-gears 9, keyed one upon the end of each shaft and disposed one upon each side of the driving member and inclosed within the members or flanges 2.

Each member 2 has an inner peripheral enlargement 10, cored out to form a circular socket 11, which receives one of a pair of intermeshing pinions 12, the shafts 13 of which have bearing in suitable journal-openings formed transversely through the members 2. These pinions have their meeting intermeshing ends overlapped one with the other and their opposite ends projecting each beyond the meshing end of the companion pinion. The projecting end of each pinion lies within one of the members 2 and meshes with one of the spur-gears 9 for driving the same.

In practice when rotary motion is imparted to member 1 in either direction the pinions 12, being opposed in their movement, interlock and through the medium of gears 9, with which they intermesh, drive the shaft 6 in same direction in which member 1 is moving.

When member 1 is being driven, either of the shaft members 6 is free to transmit to the other shaft a change of speed, decreasing in the one and increasing proportionately in the other independently of the movement of member 1. This transmission of a decreasing and increasing speed from one shaft to the other is accomplished through the medium of the pinions 12 and their intermeshing coaction with gears 9.

Pinions 12 while rotating with member 1 and driving-shafts 6 have imparted to them a secondary movement on their own axis (which is a compensating movement) arising from the constant changing of the speeds of shafts 6 when in operation driving an automobile or other vehicle. Therefore pinions 12 are in operation only when the vehicle is moving in a straight or direct course.

From the foregoing it will be seen that I produce a device of simple construction which will be efficient in operation and one in which the parts may be readily assembled. In attaining these ends it is to be understood that I do not limit myself to the precise details herein set forth, inasmuch as minor changes may be made therein without departing from the spirit of my invention. For example, in practice I propose to inclose the entire mechanism in a protecting-casing which will prevent the accumulation of dust upon the parts, and this or other similar additions or omissions in the matter of like details would not be a departure from my invention.

Having thus described my invention, what I claim is—

The combination with a centrally-disposed driving member, of a pair of flange members removably attached to and lying respectively upon opposite sides of the driving member and each having a transverse socket, a plurality of integral pins carried by one of the members and extending through registering openings provided in the driving member and other flange member, a pair of pinions seated one in each of the sockets and having overlapped intermeshing portions, a pair of gears in mesh each with one of the pinions, a pair of shafts each carrying and driven by one of the gears, and connecting-bolts extending through the driving and flange members.

In testimony that I claim the foregoing as my own I have hereto affixed my signature in the presence of two witnesses.

HARRY E. BAYLEY.

Witnesses:
A. H. DICKEY,
BERTHA SUTTON.